United States Patent [19]

Russell

[11] Patent Number: 4,800,646
[45] Date of Patent: Jan. 31, 1989

[54] TRANSFER TOOLING FOR WIRE COILS

[75] Inventor: Paul R. Russell, Roanoke, Ind.

[73] Assignee: Pease Windamatic Systems, Inc., Fort Wayne, Ind.

[21] Appl. No.: 100,611

[22] Filed: Sep. 24, 1987

[51] Int. Cl.$^4$ .......................................... H02K 15/06
[52] U.S. Cl. ...................................... 29/736; 29/596; 29/606
[58] Field of Search ................ 29/596, 598, 736, 732, 29/734

[56] References Cited

U.S. PATENT DOCUMENTS

| | | |
|---|---|---|
| 3,508,316 | 4/1970 | Hill . |
| 3,559,268 | 2/1971 | Droll . |
| 3,602,972 | 9/1971 | Droll . |
| 3,686,735 | 8/1972 | Hill . |
| 3,717,918 | 2/1973 | Droll . |
| 3,872,897 | 3/1975 | Droll et al. . |
| 4,151,636 | 5/1979 | Lauer et al. . |
| 4,432,400 | 2/1984 | Walker . |
| 4,477,966 | 10/1984 | Napierski ............................. 29/596 |
| 4,631,814 | 12/1986 | Barrera ................................ 29/736 |

Primary Examiner—Carl E. Hall
Attorney, Agent, or Firm—Pearne, Gordon, McCoy & Granger

[57] ABSTRACT

Transfer and inserter tooling for receiving coil windings from a coil winder such as a shed winder, and for inserting the coils into a dynamoelectric component such as a motor stator. The tooling includes a transfer tool molded of plastic and providing a cylindrical array of cantilever-supported fingers. The coils formed on the winder are positioned in a predetermined arrangement within the spaces between the fingers. Also included is an inserter tool having a cylindrical array of cantilever-mounted fingers and operable to insert coils positioned within the spaces between the fingers into the slots of a stator and the like. The transfer tool and inserter tool fingers are provided with interfitting alignment and guide means which properly position associated fingers of the two tools when the tools are assembled for transfer of the coils from the transfer tool to the inserter tool. The alignment and guide means operate to accurately align associated fingers even when the fingers of the transfer tool are displaced from their proper aligned positions by the windings carried therebetween.

12 Claims, 3 Drawing Sheets

TRANSFER TOOLING FOR WIRE COILS

BACKGROUND OF THE INVENTION

This invention relates generally to the production of dynamoelectric units, such as electric motors, generators, and the like, and more particularly to novel and improved transfer and inserter tooling for receiving wire coils from a coil winder and for subsequently inserting such coils into the slots of a stator or the like.

PRIOR ART

Transfer and inserter tooling is often provided to receive wire coils from a coil winder, such as a shed winder, and to subsequently insert the coils into the slots in dynamoelectric components such as the stators of electric motors or the like. In many instances, the actual insertion operation is performed by workers at various locations. Such workers assemble a stator with an inserter tool and operate the tools to insert the windings into the stator slots.

Such inserter tooling includes a large number of precision parts, normally formed of metal, and are quite expensive. Therefore, in many instances, the practice has been to provide low-cost molded plastic transfer tools onto which the coils are placed as they are wound by the coil winder. Such transfer tools with the coils thereon are then supplied to the workers at the inserter locations. The coils are transferred by the workers onto the inserter tool, and are then inserted by the inserter tool into the stator slots. By providing such low-cost transfer tooling, the number of required inserter tools for a given manufacturing facility is substantially reduced, and very large tool savings are realized. U.S. Pat. Nos. 3,508,316; 3,559,268; 3,602,972; 3,686,735; 3,717,918; 3,872,897; 3,874,424; 4,151,636, and 4,432,400 disclose various systems for transferring and/or inserting coils.

Such transfer tools normally are formed with a plurality of spaced and parallel fingers around which the coils are positioned. The inserter tools are also provided with a similar number of spaced and parallel fingers around which the coils extend, and which guide the coils as they are inserted into the stator.

During the transfer of the coils from the transfer tool to the inserter tool, the fingers of both tools are positioned in abutting alignment, and the coils are moved along the slots or spaces between the transfer tool fingers into the associated spaces or slots between the inserter tool fingers.

It is therefore essential that the associated fingers, and in turn the slots, of the transfer and inserter tools by fully aligned prior to and during the transfer. Because the fingers of the inserter tool are formed of metal, they are quite rigid and accurately maintain their relative positions. However, the fingers of the transfer tool, being formed of plastic, are somewhat flexible and their free ends are not always accurately maintained in position relative to each other.

This is particularly true in the case of transfer tools having relatively long fingers which are often required to properly support the coils for many types and sizes of stators and the like.

When the transfer tool fingers are not accurately positioned relative to each other, the workers encounter difficulty in properly positioning and maintaining the transfer tool fingers in their properly aligned position with respect to the corresponding fingers of the inserter tool. Further, if the proper alignment between the associated fingers of the transfer tool and inserter tool is not established or maintained, the coils tend to catch on the ends of the fingers of the transfer tool, with the result that the transfer cannot be accomplished easily and, in some cases, the coils are damaged so that they must be scrapped.

SUMMARY OF THE INVENTION

The present invention provides novel and improved tooling for transferring wire coils from a coil winder and for inserting such coils in dynamoelectric components such as a stator or the like. Such tooling includes a low-cost, molded transfer tool which is adapted to receive the coils directly from a coil winder, such as a shed winder, and which is adapted for transfer of the coils onto an inserter tool. The inserter tool is adapted to then insert the coils into the slots of a stator or the like.

The transfer tool and the inserter tool are both provided with a plurality of spaced and parallel fingers between which the coils extend when they are positioned on the particular tool involved. The transfer tool and inserter tools are provided with interfitting guides which facilitate the alignment of the associated fingers of the two tools when they are assembled for transferring the coils from the transfer tool to the inserter tool. Such interfitting guides also function to maintain proper alignment between the associated fingers while the coils are moved along the slots between the fingers of the transfer tool into the slots between the fingers of the inserter tool. With this invention, the interfitting guides function to establish and maintain the proper alignment between the fingers of the two tools even when the transfer tool is formed with relatively long, flexible fingers which do not of themselves reliably tend to maintain parallel positions.

With tooling in accordance with this invention, proper alignment between the associated fingers of the two tools is easily established and maintained. Consequently, the operation of transferring the coils from the transfer tool to the inserter tool is easily and quickly accomplished, and the occurrence of damage to the coils during such transfer is virtually eliminated.

In the illustrated embodiment, the fingers of the inserter tool are arranged in a circle, and are positioned and sized to fit into the interior cylindrical opening of a stator, with the slots between the fingers aligned with the slots in the stator. The sides of the fingers located on the outside of the circle, and which fit along the portion of the stator between the stator slots, are formed with a longitudinally extending groove of uniform cross section. In the illustrated embodiment, such groove is substantially square in cross section and is open on the outer side thereof along the length of the fingers.

The transfer tool fingers are formed with longitudinally extending ribs or projections shaped to mate with the grooves formed in the associated finger of the inserter tool so as to interlock the associated fingers in an aligned position. In addition, the ends of the projections on the transfer tool fingers are formed with a chisel-like point. Such point provides inclined camming surfaces which automatically function to bring the fingers of the transfer tool into proper alignment with the fingers of the inserter tool as the transfer tool and inserter tool are brought into operative engagement. Therefore, if the free ends of the fingers of the transfer tool are not maintained in exactly the correct position, due to flexibility of the fingers and/or lateral forces imposed on the fingers by the coils, the transfer tool fingers are automatically cammed into proper alignment with the associated fingers of the inserter tool. Thereafter, as the two tools are moved into the fully assembled position in which the fingers overlap, the projection and groove maintain proper orientation and alignment. Consequently, the coils can be moved along the spaces from the transfer tool into the inserter tool without difficulty, and without resulting in damage to the coils.

These and other aspects of this invention are illustrated in the accompanying drawings, and are more fully described in the following specification, wherein:

FIG. 2b is an enlarged view similar to FIG. 2a, but schematically illustrating an inserter tool used with the transfer tool of FIG. 2a;

FIG. 3 is a plan view of the transfer tool of FIG. 2a;

FIG. 4 is an enlarged, fragmentary, exploded view of the end of a transfer tool finger and an associated inserter tool finger, illustrating the fingers in the position they assume as they approach each other during the assembly of the two tools;

FIG. 4a is an enlarged, fragmentary cross section, illustrating an associated pair of fingers of the two tools in their interfitting, assembled position;

FIG. 4b is an enlarged, longitudinal view, partially in section, of the pair of fingers of FIG. 4a;

DETAILED DESCRIPTION OF THE DRAWINGS

Figure 1:
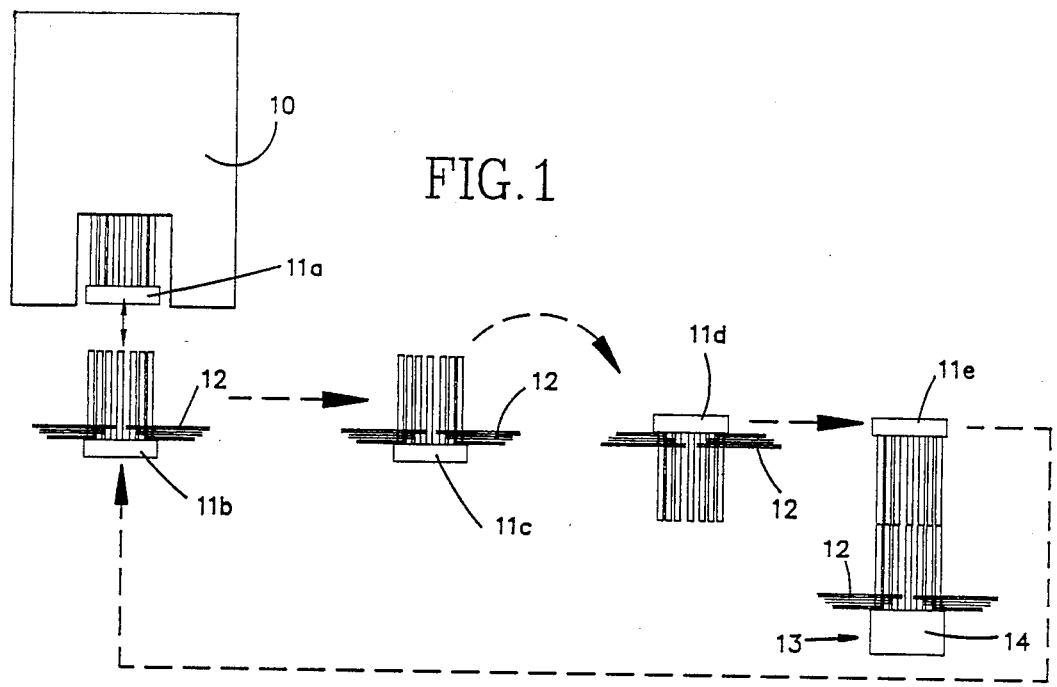
FIG. 1 is a schematic illustration of the overall system, utilizing tooling in accordance with the invention.

FIG. 1 schematically illustrates a coil winding system including transfer tooling in accordance with the present invention. In such system, a coil winder, such as a shed winder schematically illustrated at 10, receives a transfer tool 11 in the position 11a and winds coils 12 thereon. After the coils 12 are wound on the transfer tool, it is removed from the coil winder 10, as indicated at position 11b, and is subsequently moved, as represented at positions 11c and 11d, to a work station at 13, where it is assembled with an inserter tool 14 in an inverted position, as indicated at 11e. The transfer tool 11 is illustrated in its assembled inverted position at location 11e, and after the coils 12 have been transferred to the inserter tool 14. After the coils are transferred to the inserter tool, the transfer tool is returned to the coil winder 10 and is reloaded with a subsequent group of coils 12. In a typical system, a single coil winder 10 supplies coils to a number of transfer tools 11, which in turn supply coils to work station 13 at a number of different locations.

Figure 2A:
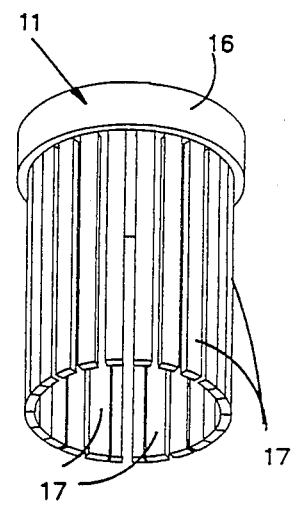
FIG. 2a is an enlarged, schematic, perspective view of the transfer tool.
Figure 3:
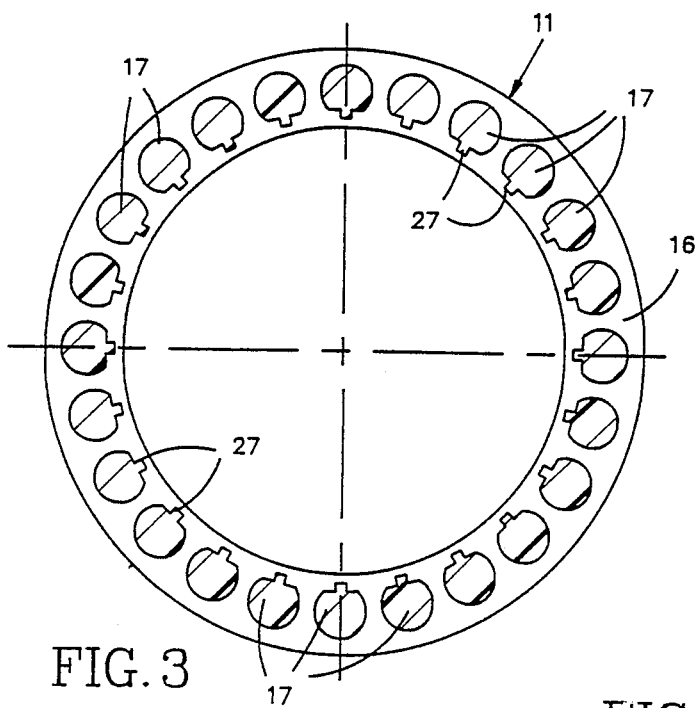
Figure 2B:
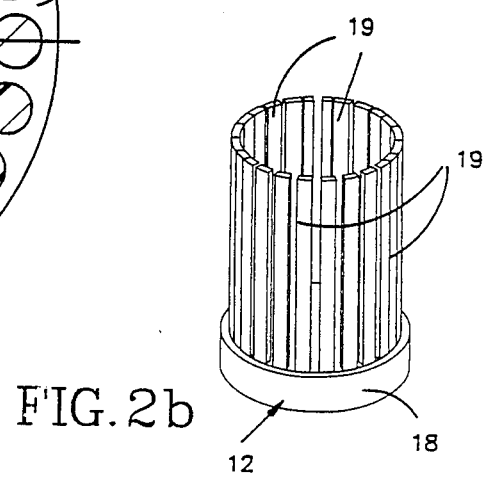

FIGS. 2a and 2b respectively schematically illustrate the general structure of the transfer tool 11 and the inserter tool 14. As illustrated, the transfer tool 11 includes an annular base 16 and a plurality of parallel and spaced fingers 17 extending in cantilever fashion from the base and arranged in a circular array.

The inserter tool 14 is also formed with a circular base 18 and a plurality of inserter tool finger assemblies 19 extending in a cantilever fashion from the base 18 in spaced, parallel relationship. Here again, the fingers 19 are arranged in a circular array so that during the inserting operation, the inserter fingers 19 can extend into a stator and insert the coils carried by the inserter tool into the slots of the stator, as described in greater detail below.

In FIGS. 2a and 2b, no attempt is made to illustrate the shape of the fingers of the two tools in detail, but such fingers are schematically shown for purposes of illustration, and so as to illustrate the general configuration of the fingers on the tools. Further, the inserter tool finger assemblies are illustrated without the associated wedge guides and the like which are included in a completed inserter tool. Persons skilled in the art are familiar with the structural detail of a typical inserter tool, and the inserter tool incorporating the present invention differs from a conventional inserter tool only to the extent that the inserter tool finger assemblies 19 are provided with guide grooves, as discussed in detail below.

Figures 4, 4A, 4B:
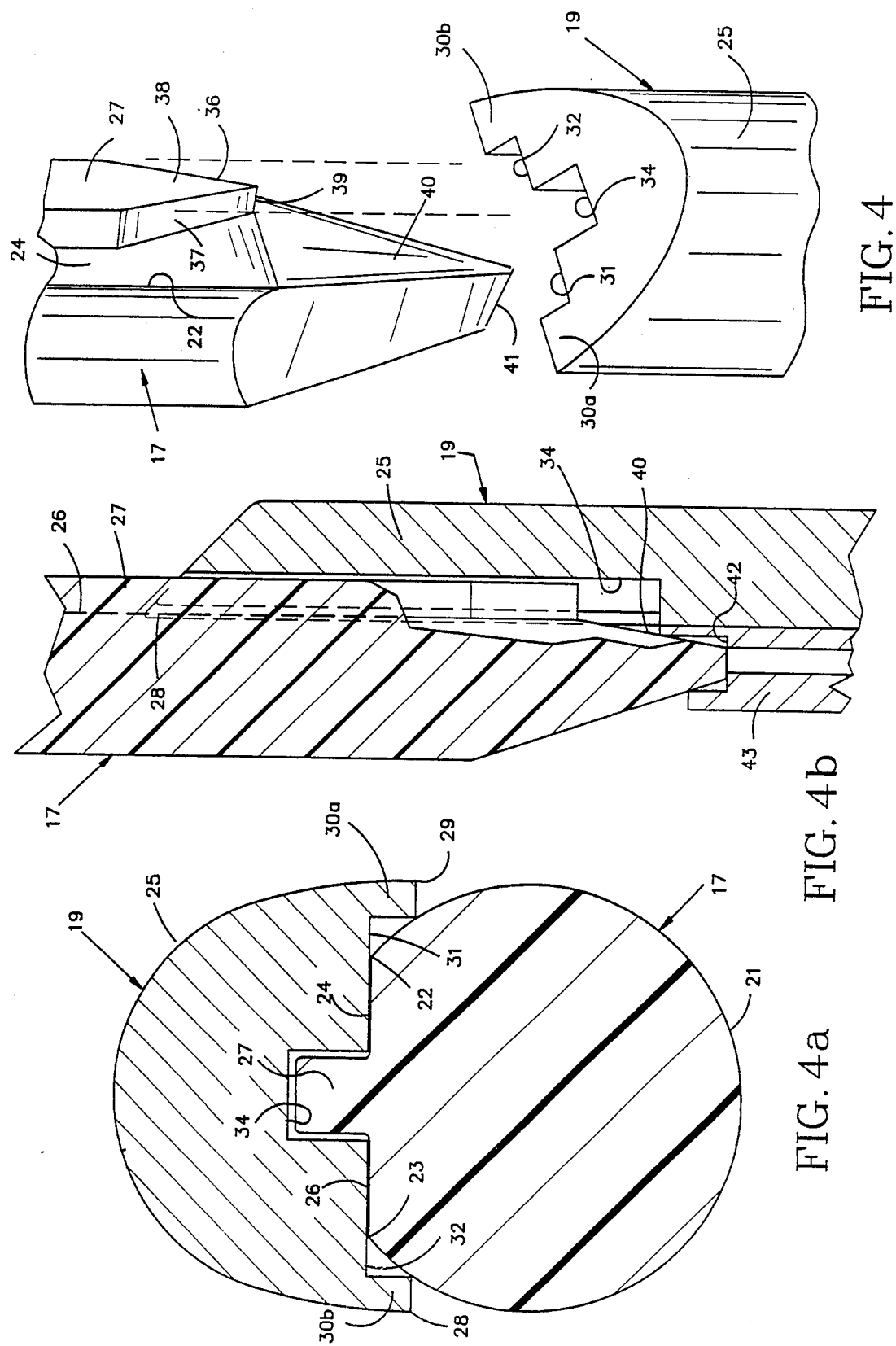

Referring to FIGS. 3, 4, 4a, and 4b, the inserter tool fingers 17 in the illustrated embodiment are formed with a generally circular cross section as best illustrated in FIG. 4a, and provide a circular peripheral portion 21 extending from the point 22 to the point 23. Each of the fingers 17 is also formed with flat portions 24 and 26 respectively extending from the associated points 22 and 23 to a guide projection or rib 27. In the illustrated embodiment, the rib 27 is substantially square in cross section.

The illustrated fingers 19 of the inserter tool have a cross section, also best illustrated in FIG. 4a, providing a generally circular peripheral portion 25 extending from the point 28 to the point 29. Inwardly from such points, the finger is provided with a recess providing flat portions 31 and 32, which respectively engage the portions 24 and 26 and terminate at their outer ends at a location spaced from the peripheral portion 25 so as to provide projections 30a and 30b which extend into the slots in a stator, as described below.

Between the planar portions 24 and 26, the fingers 19 are provided with a recess 34 proportioned to receive the associated projection 27 of the fingers 17. In FIGS. 4a and 4b, the clearances are exaggerated for purposes of illustration, but it should be understood that the projections 27 fit within the recesses or grooves 34 with a close fit.

The projections 27 and grooves 34 extend longitudinally along their respective fingers, and, in the case of the grooves 34, are open to the ends of the fingers 19, as illustrated in FIGS. 4 and 4b. The ends of the projections 26 are spaced back from the free ends of the fingers 17 and are formed with a chisel-point 38 which provides inclined camming surfaces 37 and 36. The camming surfaces intersect at the end of the projections 27 along edges 39.

The ends of the fingers 17 extend beyond the ends of the projections substantially to a point at 41, and are proportioned to fit in a recess 42 in a wedge guide 43 which constitutes part of each finger assembly 19 on the inserter tool. Such point extension also provides an inclined surface 40 that can also provide a camming function.

Preferably, the transfer tools, to minimize costs, are formed of plastic which is molded to shape. Such plastic transfer tools therefore have fingers 17 which are somewhat flexible, and, in the case of transfer tools which require long fingers because of the coil geometry, the free ends of the finger tend to be displaced from their normal parallel alignment by the coils wound thereon.

With the present invention, the camming surfaces 37 and 36 provided by the chisel-shaped end on the projection and the inclined surface 40 cooperate to cam the fingers 17 of a transfer tool into exact alignment with the associated fingers 19 of the inserter tool as the two tools are moved toward their assembled position. As the assembly continues, the projections 27 move down along the associated groove to maintain proper alignment and to ensure that all of the fingers of the two tools are properly mated with each other.

Figure 5:
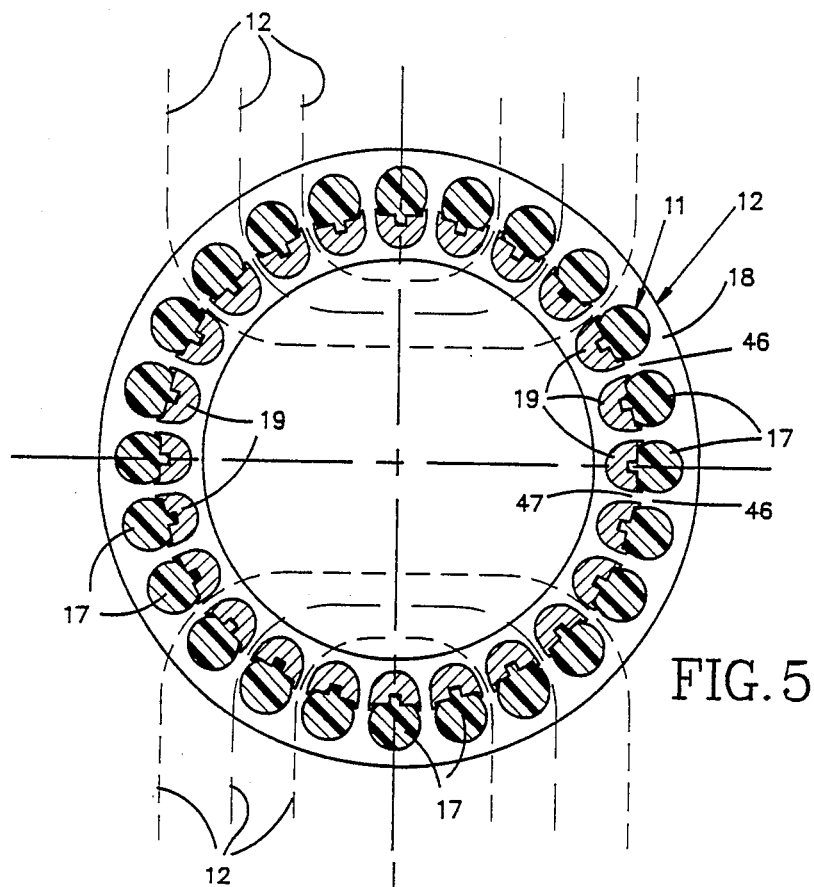
FIG. 5 is a plan view in section, illustrating tools assembled for transfer with the coils illustrated in phantom.

FIG. 5 illustrates the two tools in the assembled position in which the coils 12 (illustrated in phantom) are transferred from the transfer tool to the inserter tool. In such position, each finger 17 of the transfer tool is exactly aligned with the associated finger 19 of the inserter tool and is locked in such aligned position by the mating engagement of the grooves 34 and projections 27. In such assembled position, the spaces 46 between the fingers 17 of the transfer tool are in perfect alignment with the spaces 47 between the fingers 19 of the inserter tool.

During the winding operation, such coils 12 are formed and positioned in the spaces 46 by the winding machine 10 and are maintained in a predetermined arrangement by the fingers 17 of the transfer tools between which they extend. When the tools are assembled, it is therefore merely necessary to slide the coils 12 down along the spaces 46 between the fingers of the transfer tool into the spaces 47 between the fingers 19 of the inserter tool. During such movement, the predetermined arrangement of the coils is maintained.

Because the fingers of the two tools are maintained in perfect alignment during such transfer of the coils, the coils do not tend to hang up or catch on the ends of the fingers of the inserter tool, and a smooth transfer is easily and quickly accomplished. Further, any damage to the coils during such transfer is avoided, so that scrap is minimized.

Once the coils 12 have been transferred to the inserter tool, the two tools are disassembled and the transfer tube is returned to the winder to receive a subsequent set of coils 12.

Figure 6:
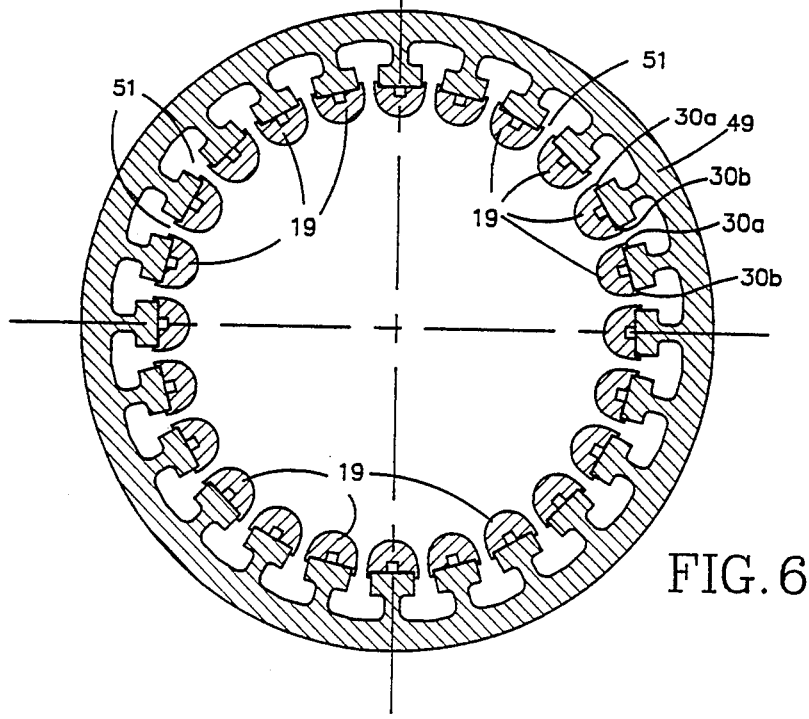
FIG. 6 illustrates the insert tool positioned in a stator.

A stator 49 is then positioned around the fingers of the inserter tool, as illustated in FIG. 6. In such position, each of the fingers of the inserter tool is positioned in alignment with the portion of the stator between the slots 51. In such position, the edge projections 30a and 30b project into the slots a small distance to guide and protect the coils as the inserter tool transfers the coils into the slot 51 of the stator 49.

Since the grooves 34 are formed in the face of the fingers which engages the adjacent surface of the stator, their presence does not in any way adversely affect the operation of the inserter tool.

The manner in which the inserter tool functions to position the coils within the slot 51 is known to persons skilled in the art, and therefore need not be set forth in detail herein.

With the present invention, sets of wire coils can be positioned by a conventional winder on a transfer tool and subsequently transferrd to an inserter tool. The ease of assembling the inserter tool and the transfer tool for transfer of the coils to the inserter tool is greatly enhanced by the interfitting projections and recesses formed in the associated fingers of the tooling. Therefore, the operator or worker at each of the work stations can accomplish proper assembly very quickly, thus saving labor costs. This is true even when the transfer tool fingers are relatively flexible and are often displaced from perfect alignment relative to each other by the coils wound therebetween. Since the assembly can be accomplished easily, and since exact alignment between associated fingers is maintained, the coils can be easily moved from the transfer tool into the inserter tool without damaging the coils. Savings in labor costs are realized and the possibility of damage to the coils caused during such transfer is virtually eliminated.

Although the preferred embodiment of this invention has been shown and described, it should be understood that various modifications and rearrangements of the parts may be resorted to without departing from the scope of the invention as disclosed and claimed herein.

What is claimed is:

1. Tooling for transferring wire coils from a coil winder and for inserting such coils into a dynamoelectric component, comprising a transfer tool having a plurality of aligned elongated cantilever-supported fingers spaced from each other by transfer tool spaces and supported by a transfer tool base, and an inserter tool having a plurality of aligned elongated cantilever-mounted inserter tool fingers spaced from each other by inserter tool spaces, said transfer tool receiving in said transfer tool spaces a plurality of wire coils from a coil winder and maintaining said coils in a predetermined relationship, said inserter tool receiving said coils in said inserter tool spaces in said predetermined relationship from said transfer tool and maintaining said predetermined relationship after said inserter tool and said transfer tool are separated, said inserter tool operating after said inserter tool and said transfer tool are completely separated to insert said coils into said dynamoelectric components, said transfer tool and inserter tool being sized and shaped for assembly in a unit in which each finger of one of said transfer tool or said inserter tool fits with an associated finger of the other of said transfer tool or inserter tool to position associated spaces on said tools in alignment permitting coils within said spaces in said transfer tool to be moved along said transfer tool spaces into said inserter tool spaces while maintaining said predetermined arrangement, said transfer tool fingers and said inserter tool fingers being provided with longitudinally extending alignment and guide means which interfit when said tools are assembled as a unit to establish exact alignment of said fingers and thereby maintain exact alignment of associated spaces of said tools so that said coils can smoothly move along said spaces from said transfer tool onto said inserter tool while maintaining said predetermined arrangement, said transfer tool fingers being flexible and movalbe from their aligned position, said guide means including camming surfaces on the ends of said fingers of one of said tools for aligning said transfer tool fingers with said inserter tool fingers as said fingers initially engage during assembly of said tools.

2. Tooling as set forth in claim 1, wherein said inserter tool fingers are sufficiently rigid to maintain their alignment and to cause said camming surfaces to align said transfer tool fingers during said assembly.

3. Tooling as set forth in claim 2, wherein said transfer tool is a molded non-metallic tool.

4. Tooling as set forth in claim 2, wherein said fingers of said one of said tools are formed with longitudinally extending grooves and said fingers of said other of said tools are provided with a longitudinally extending projection which mates with an associated groove on said one tool and moves therealong as said tools are assembled.

5. Tooling as set forth in claim 4, wherein said grooves extend along a face of said fingers of said inserter tool which fits against a surface of said dynamoelectric component during insertion of said coils therein.

6. Tooling as set forth in claim 5, wherein said projections provide said camming surfaces at the ends thereof, said camming surfaces providing initial engagement between said guide means during said assembly.

7. Tooling as set forth in claim 6, wherein said ends of said projections are formed with a chisel shape to provide said camming surfaces.

8. Tooling as set forth in claim 7, wherein said dynamoelectric component provides a cylindrical surface with peripherally spaced radial grooves open to said cylindrical surface.

9. Tooling as set forth in claim 9, wherein said dynamoelectric component is a stator.

10. A transfer tool for receiving wound coils from a coil winder in a predetermined arrangement and for transferring said coils to fingers of an inserter tool for inserting said windings into a dynamoelectric component after said coils have been transferred to said inserter tool and said inserter tool and said transfer tool are completely separated, comprising a transfer tool base, an array of elongated fingers cantilever-mounted on said base in spaced parallel. Relationship and having free ends, said transfer tool fingers being sufficiently flexible to deflect from positions of complete alignment with each other when said coils are supported on said transfer tool, each of said fingers having a longitudinally extending projection shaped to mate with a groove of an associated finger of said inserter tool, said projections moving along said inserter tool grooves when said transfer tool is assembled with said inserter tool for transfer of said coils therebetween, said projections having camming surfaces at the ends thereof for cooperating with associated grooves upon initial engagement with said associated grooves of associated fingers of said inserter tool to establish alignment therebetween.

11. A transfer tool as set forth in claim 10, wherein said ends of said projections are formed with a chisel shape to provide said camming surfaces.

12. A transfer tool as set forth in claim 11, wherein the ends of said transfer tool finger beyond the ends of said projections provide additional camming surfaces for initially engaging associated fingers of said inserter to cam said projections toward alignment with an associated groove.

* * * * *

UNITED STATES PATENT AND TRADEMARK OFFICE
CERTIFICATE OF CORRECTION

PATENT NO. : 4,800,646

DATED : January 31, 1989

INVENTOR(S) : Paul R. Russell

It is certified that error appears in the above-identified patent and that said Letters Patent is hereby corrected as shown below:

Column 1, line 52 "by" should be --be--.

Column 7, line 20 "9" should be --8--.

Column 8, line 3 "parallel. Relationship" should be --parallel relationship--.

Signed and Sealed this

Fifteenth Day of August, 1989

*Attest:*

DONALD J. QUIGG

*Attesting Officer*   *Commissioner of Patents and Trademarks*